United States Patent Office 3,519,658
Patented July 7, 1970

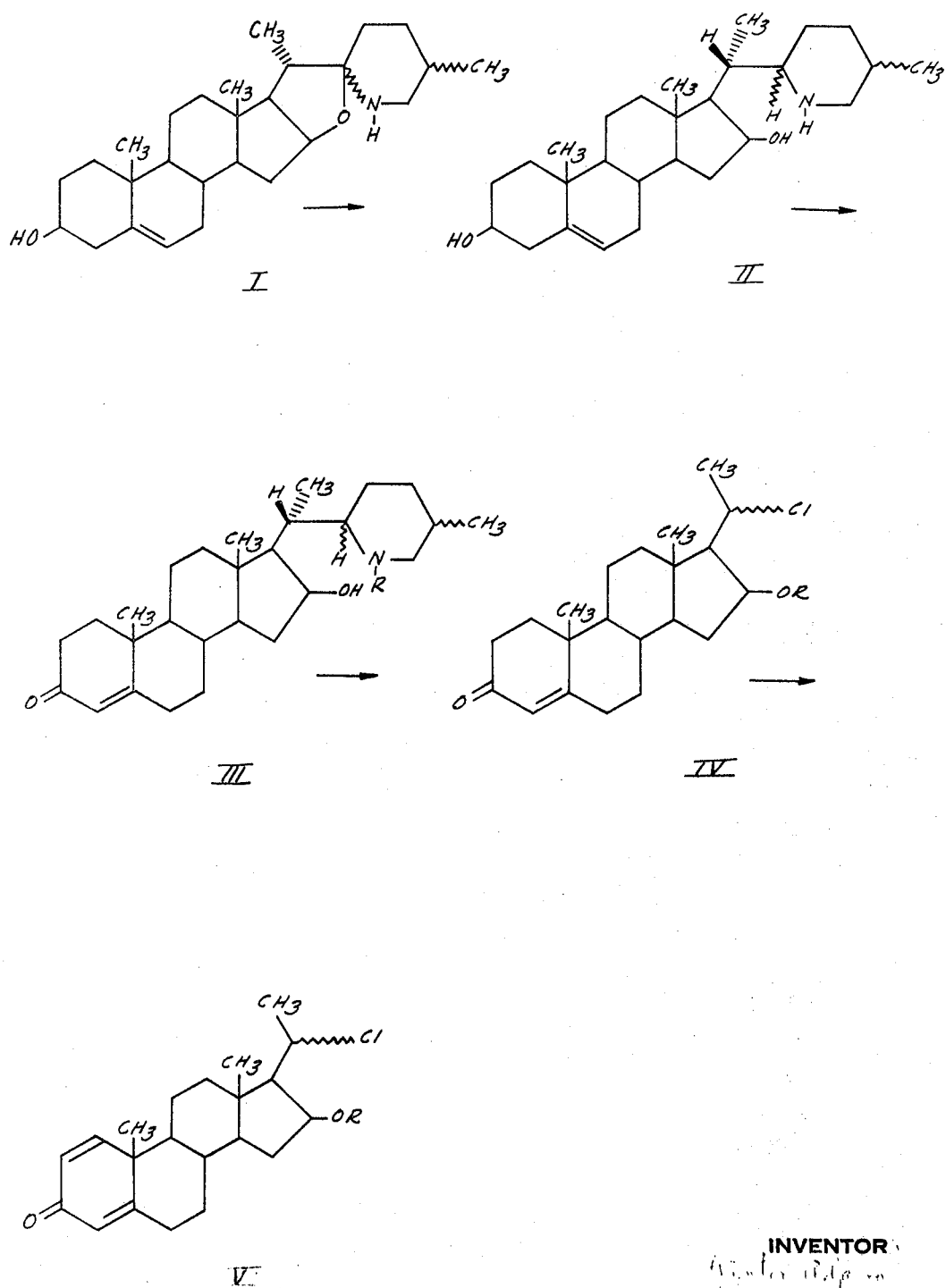

3,519,658
CHLORO-PREGNANE COMPOUNDS AND PROCESS OF MAKING THE SAME
Günter Adam and Klaus Schreiber, Gatersleben, Germany, assignors to Deutsche Akademie der Wissenschaften zu Berlin, Berlin-Adlershof, Germany
Filed Oct. 3, 1967, Ser. No. 672,528
Int. Cl. C07c *169/20, 169/32*
U.S. Cl. 260—397.4    17 Claims

ABSTRACT OF THE DISCLOSURE $\Delta^4$-3-keto-pregnenes and $\Delta^{1,4}$-3-keto-pregnadienes are obtained from steroid-alkaloids of the spirosolane type by reducing a $\Delta^5$-spirosolane alkaloid, upon opening of the E-ring, to a stereoisomeric 22,26-imino-cholest-5-ene-3$\beta$,16$\beta$-diol; oxidizing the product obtained to the $\Delta^4$-3-one-16$\beta$-hydroxy compound; then halogenating the product to the N-halogeno-derivative; thereupon breaking down the halogenated derivative to the corresponding 20-halogen substituted $\Delta^4$-3-keto-pregnene. This pregene may then be dehydrogenated further to the corresponding $\Delta^{1,4}$-pregnadiene-3-one.

The final componds are the 16$\beta$-hydroxy or 16$\beta$-acetoxy derivatives as shown in IV and V of the attached drawing.

BACKGROUND OF THE INVENTION $C_{21}$ steroids of the pregnane series are of great significance in medicine because of their many pharmacological properties. An important natural starting material for making these steroids are solanum steroid alkaloids of the spirosolane type such as solasodine. Several methods have already been proposed for the degradation of these alkaloids to pregnanes. Some of these proceed from either the $\Delta$-5-unsaturated or from the 5$\alpha$-saturated spirosolane alkaloids and, via N-acylation of N-nitrosation, leads to the 3$\beta$-acetoxy-pregna-5,16-diene-20-one or the corresponding 5$\alpha$ compound. However, this method is limited to the type of pregnane compound indicated.

Another method accomplishes the break-down of the spirosolane alkaloids in three steps to form the 20-stereoisomers of the 20-chloro-3$\beta$,16$\beta$-diol-5$\alpha$-pregnane. The spirosolane alkaloids are reduced in this process to the $C_{22}$ and $C_{25}$ stereoisomers of 22,26-imino-5$\alpha$-cholestane-3$\beta$,16$\beta$-diol followed by N-chlorination and then photofragmentation of the N-chloro-derivative in the presence of an acid so as to obtain the 20-chloro-5$\alpha$-pregnanediols. It is, however, not possible by this method to break down the 22,26-iminocholestanediols with a $\Delta^5$ double bond to the corresponding 20-chloro-preg-5-ene-3$\beta$,16$\beta$-diols and thus to obtain 20-chloropregnenes with the biologically important $\Delta^4$-3-keto or $\Delta^{1,4}$-3-keto groups.

SUMMARY OF THE INVENTION

It is therefore an object of the invention to accomplish the break-down of $\Delta^5$-spirosolane-alkaloids to $C_{21}$ steroids of the pregnane series while making use of the $\Delta^5$ double bond to modify the structure of the A-ring.

This is accomplished by reducing a $\Delta^5$-spirosolane alkaloid, upon opening of the E-ring, to a stereoisomeric 22,26-imino-cholest-5-ene-3$\beta$,16$\beta$-diol; oxidizing the product obtained to the $\Delta^4$-3-one-16$\beta$-hydroxy compounds; then halogenating the product to the N-halogeno-derivative; thereupon breaking down the halogenated derivative to the corresponding 20-halogen substituted $\Delta^4$-3-keto-pregnene. This pregnene may then be dehydrogenated further to the corresponding $\Delta^{1,4}$ pregnadiene-3-one.

The final compounds are the 16$\beta$-hydroxy or 16$\beta$-acetoxy derivatives as shown in IV and V of the attached drawing.

BRIEF DESCRIPTION OF THE DRAWING

The attached drawing illustrates an embodiment of the process of the invention and shows two types of products obtained.

I is the solasodine used as starting product;
II is the product obtained by opening the E-ring of the solasodine and reducing the compound to the 3,16$\beta$-hydroxy compounds;
III illustrates the oxidation of the 3-hydroxy group to the keto group and the introduction of halogen into the imino group;
IV illustrates the break-down to the 20-chloro-$\Delta^4$-3-keto-pregnane; and
V illustrates the reduction of the latter compound to the $\Delta^{1,4}$ compound.

DESCRIPTION OF THE PREFERRED EMBODIMENTS

As stated, the process of the invention proceeds in several steps. In the first step a reduction and opening of the E-ring of the $\Delta^5$-spirosolane alkaloid is effected to form stereoisomeric 22,26 - imino - cholest-5-ene-3$\beta$,16$\beta$-diols. The latter are then converted by oxidation into the corresponding $\Delta^4$-3-ketones and subjected to chlorination in the imino group. The N-chloro derivative is then degraded in the presence of an acid by means of ultraviolet radiation to the corresponding pregnene compound. This product may further be rehydrogenated to the $\Delta^{1,4}$-pregnadiene-3-one.

Thus, solasodine (22R:25R)—see drawing Formula I—or tomatidine (22S:25S) may, for instance, be reduced to the stereoisomeric 22,26-imino-cholest-5-ene-3$\beta$,16$\beta$-diol (Formula II) by reaction with sodium boranate in methanol upon opening of the E-ring. Partial Oppenauer oxidation of the resulting compound, for instance, with cyclohexanone/aluminum isopropylate in toluene produces 16$\beta$-hydroxy - 22,26 - imino-cholest-4-ene-3-one (see Formula III wherein R is H). This compound can be converted almost quantitatively into the corresponding N-chloro derivative (Formula III) wherein R is Cl by reaction with N-chloro succinimide in methylene chloride.

If these N-chloro derivatives are irradiated with ultraviolet light in the presence of an acid, for instance trifluoroacetic acid, the piperidine ring is split off upon opening of the bond between the carbon atoms 20 and 22. Thus 20 - chloro - 16$\beta$-hydroxy-$\Delta^4$-3-one-pregnenes are obtained (see Formula IV wherein R is H). There are thus formed the two (20R) and (20S) stereoisomers which can be separated by column chromatography on aluminum oxide and can be recovered in crystalline form. Acetylation with acetic anhydride/pyridine leads to the corresponding 16$\beta$-acetyl derivatives (see Formula IV wherein R is Ac).

The 20-chloro-$\Delta^4$-3-keto compounds upon dehydrogenation, for instance, with 2,3-dichloro-5,6-dicyano-1,4-benzoquinone in boiling benzene produces the corresponding (20R) and (20S), respectively, isomers of the 20-chloro-16$\beta$ - hydroxy-$\Delta^{1,4}$-pregnadiene-3-one (see Formula V wherein R is H). After acetylation with acetic anhydride/pyridine there is obtained the 16$\beta$-acetyl derivative (see Formula V wherein R is Ac).

The described sequence of reactions illustrates a new approach to the degradation of the $\Delta^5$-spirosolane alkaloids which leads to heretofore unknown 20-chlorinated pregnane derivatives with $\Delta^4$-3-keto and $\Delta^{1,4}$-keto groups. These compounds are of pharmacological interest in view of their hormonal (antihormonal) action. They have a strong antiandrogenous and progestational action. Also, the compounds are important as intermediates for producing other steroids.

EXAMPLE I (a) (22S:25R) - 22,26 - imino - cholest - 5-ene-3β,16β-diol (Formula II) is produced from solasodine (Formula I) as follows:

5 grams solasodine are dissolved in 250 cc. of hot methanol. The solution is cooled to room temperature and reacted with 3 grams of sodium boranate. Water is added after 60 minutes to the mixture whereupon the precipitate is removed by suction after letting the mixture stand for 14 hours at 0° C. This step is then followed by drying. Recrystallization from ethanol furnishes (22S:25R)-22,26-imino-cholest-5-ene-3β,16β-diol; M.P. 262 to 264° C.; $[\alpha]_D^{18}$ −64.6° (chloroform).

(b) (22S:25R) - 16β - hydroxy - 22,26-imino-cholest-4-ene-3-one (Formula III wherein R is hydrogen) is produced from (22S:25R)-22,26-imino-cholest-5-ene-3β,16β-diol (Formula II) as follows:

A solution of 0.3 gram aluminum isopropylate in 4 cc. anhydrous toluene is added dropwise through a period of 15 minutes to 1 gram of (22S:25R)-22,26-imino-cholest-5-ene-3β,16β-diol dissolved in 20 cc. anhydrous toluene and 5 cc. cyclohexanol upon vigorous boiling. Simultaneously, 6 cc. of toluene and later another 3 cc. of toluene are removed by distillation. 5 cc. of a saturated aqueous Rochelle salt solution are added after cooling to the reaction solution and 70 cc. of the distillate are then driven off with steam. The remaining solution is extracted five times with methylene chloride. The combined extracts are dried over sodium sulfate and concentrated in vacuo. The oil obtained is dissolved in 6 cc. benzene and subjected to chromatography with 30 grams of aluminum oxide of activity I. Elution of the column with a benzene/ether mixture produces (22S:25R)-16β-hydroxy-22,26-imino-cholest-4-ene-3-one, which after recrystallization from acetone-water, has a melting point of 203 to 204° C.; and $[\alpha]_D^{19}$+49.3° (chloroform).

(c) (22S:25R) - N - chloro-16β-hydroxy-22,26-imino-cholest-4-ene-3-one (see Formula III where R is Cl) is produced from (22S:25R) - 16β - hydroxy-22,26-imino-cholest-4-ene-3-one (Formula III where R is H) as follows:

0.32 gram of (22S:25R)-16β-hydroxy-22,26-imino-cholest-4-ene-3-one are dissolved in 50 cc. of methylene chloride and there are added to the solution dropwise at a temperature between −5 and −10° C. during a period of 15 minutes 0.1 grams N-chloro-succinimide dissolved in 10 cc. methylene chloride. After stirring for another 30 minutes at room temperature the solution is shaken three times with water and after drying over sodium sulfate is concentrated by evaporation in vacuo. There is obtained amorphous (22S:25R) - N - chloro - 16β - hydroxy-22,26-imino-cholest-4-ene-3-one; $[\alpha]_D^{20}$−1.9° (chloroform).

(d) (20R)- and (20S)-20-chloro-16β-hydroxy-pregn-4-ene-3-one (Formula IV, wherein R is H) as well as (20R)- and (20S)-20-chloro-16β-acetoxy-pregn-4-ene-3-one (Formula IV, wherein R is Ac) is obtained from (22S:25R) - N - chloro-16β-hydroxy-22,26-imino-cholest-4-ene-3-one (Formula III, wherein R is Cl) by the following method:

0.3 gram of (22S:25R)-N-chloro-16β-hydroxy-22,26-imino-cholest-4-ene-3-one are dissolved in 10 cc. of freshly distilled trifluoroacetic acid at 0° C. and are irradiated with ultraviolet light by means of a quartz lamp for 15 minutes at 25° C. and in an atmosphere of argon. The solvent is removed by distillation in vacuo at 20° C. The residual oily photolysis product is dissolved in 50 cc. methylene chloride and shaken at room temperature for 30 minutes after adding 20 grams of sodium bicarbonate. The filtered solution is concentrated by evaporation in vacuo; the residue is dissolved in 5 cc. benzene and subjected to chromatography with 17 grams aluminum oxide of activity I. Upon elution of the column with benzene/ether in a ratio of 8:2 there is first obtained (20S)-20-chloro-16β-hydroxy-pregn-4-ene-3-one having a melting point between 222 and 225° C.: $[\alpha]_D^{20}$+104° (chloroform). Subsequently, (20R) - 20 - chloro-16β-hydroxy-pregn-4-ene-3-one is obtained by means of benzene/ether at a ratio of 7:3; M.P. 221 to 223° C.; $[\alpha]_D^{20}$+99.2° (chloroform).

EXAMPLE II 150 mg. of (20R)-20-chloro-16β-hydroxy-22,26-imino-cholest-4-ene-3-one are dissolved in 1.5 cc. of anhydrous pyridine, reacted with 1.5 cc. acetic anhydride and permitted to stand at 20° C. for 16 hours. The mixture is poured into ice water, the precipitate thus formed is removed by suction and washed with water to free it of the pyridine and is then dried. Recrystallization from acetone/water produces (20R)-20-chloro-16β-acetoxy-pregn-4-ene-3-one; M.P. 168 to 169° C. and $[\alpha]_D^{19}$+113.5° (chloroform). From the (20S) stereoisomer of the 16β-hydroxy compound one can obtain in an analogous manner the (20S) - 20 - chloro - 16β - acetoxy - pregn - 4 - ene - 3-one; M.P. 189–191° C.; $[\alpha]_D^{20}$ +124.2° (chloroform).

EXAMPLE III (20S) - 20 - chloro-16β-hydroxy-pregna-1,4-diene-3-one (Formula V wherein R is H) and (20S)-20-chloro-16β-acetoxy-pregna-1,4-diene-3-one (Formula V wherein R is Ac) are obtained from (20S)-20-chloro-16β-hydroxy-pregn-4-ene-3-one (Formula IV wherein R is H) by the following steps:

1 gram of (20S)-20-chloro-16β-hydroxy-pregn-4-ene-3-one is heated upon reflux in 100 cc. benzene with 0.81 grams 2,3-dichloro-5,6-dicyano-1,4-benzoquinone for 24 hours. After washing of the benzene phase with 1 N sodium hydroxide and water one dries over sodium sulfate and concentrates by evaporation in vacuo. After recrystallization of the residue from acetone/water there is obtained (20S) - 20 - chloro-16β-hydroxy-pregna-1,4-diene-3-one; M.P. 223 to 226° C. and $[\alpha]_D^{19}$ +42.4° (chloroform).

EXAMPLE IV 200 mg. of (20S)-20-chloro-16β-hydroxy-pregna-1,4-diene-3-one dissolved in 2 cc. of anhydrous pyridine are reacted with 2 cc. acetic anhydride and kept at 20° C. for 16 hours. After pouring into ice water, removal of the precipitate by suction, washing with water and drying one obtains (20S)-20-chloro-16β-acetoxy - pregna-1,4-diene-3-one. After recrystallization from acetone/hexane the melting point is 206–208° C.; $[\alpha]_D^{19}$ +61.3° (chloroform).

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. The process of making steroid compounds selected from the group of $\Delta^4$-3-keto-pregnenes and $\Delta^{1,4}$-3-keto-pregnenes comprising the step of reducing a $\Delta^5$-spiro-solane alkaloid upon simultaneous opening of the E-ring by reaction with a borane in an organic solvent so as to form a stereoisomeric 22,26-imino-cholest-5-ene-3β, 16β-diol; oxidizing the latter product by an Oppenauer oxidation so as to form 22,26-imino-$\Delta^4$-3-keto-cholestene-16β-ol; halogenating the product to obtain N-halo-22,26-imino-$\Delta^4$-3-keto-cholestene-16β-ol thereupon splitting off the piperidine ring by irradiation with ultraviolet light in the presence of an acid thereby forming a 20-halogen-16β-hydroxy-$\Delta^4$-3-keto-pregnene.

2. The process of claim 1 wherein the 20-halogen substituted $\Delta^4$-3-keto pregnene compound is reacted with 2,3- dichloro-5,6 dicyano-1,4-benzoquinone to form the $\Delta^{1,4}$-16β-hydroxy pregnadiene.

3. The process of claim 2 wherein the $\Delta^{1,4}$-16β-hydroxy pregnene is thereafter reacted with an acetylating agent to form the $\Delta^{1,4}$-16β-acetyl derivative.

4. The process of claim 3 wherein the acetylating agent is acetic anhydride in a medium of pyridine.

5. The process of claim 1 wherein the halogenation is effected by introducing a chlorine atom into the imino group.

6. The process of claim 5 wherein the chlorination is effected by reaction with N-chloro-succinimide in a medium of methylene chloride.

7. The process of claim 1 wherein a reduction and opening of the E-ring is effected by reaction with sodium borane in the presence of methanol.

8. The process of claim 1 wherein the partial Oppenauer oxidation is effected with cyclohexanone in the presence of aluminum isopropylate in the presence of an inert solvent.

9. The process of claim 1 wherein the ultraviolet treatment is effected in trifluoroacetic acid.

10. The process of claim 1 wherein the 20-halogen-16β-hydroxy-$\Delta^4$-3-keto-pregnene is thereafter subjected to acetylation of the hydroxyl group by reaction with an acetylating agent.

11. The process of claim 10 wherein the acetylating agent is acetic anhydride in the medium of pyridine.

12. The process of claim 1 wherein the 20-halogen-16β-hydroxy-$\Delta^4$-3-keto-pregnene compound is thereafter dehydrogenated to form the 20-halogen-16β-hydroxy-$\Delta^{1,4}$-3-keto-pregnene.

13. The process of claim 1 wherein a compound selected from the group consisting of solasodine and tomatidine is reduced by reaction with a borane in an organic solvent so as to form the 22,26-imino-cholest-5-ene-3β,16β-diol, followed by a partial Oppenauer oxidation so as to form the 16β-hydroxy-22,26-imino-cholest-4-ene-3-one whereupon the product is subjected to halogenation to form N-halo-16β-hydroxy-22,26-imino - cholest-4-ene-3-one followed by degradation of the product by ultraviolet light in the presence of an acid to form 20-halo-16β-hydroxy-$\Delta^4$-3-one pregnene.

14. The process of claim 1 wherein the 20-chloro-16β-hydroxy-$\Delta^4$-3-one pregnene is thereafter dehydrogenated to 20-chloro-16β-hydroxy-$\Delta^{1,4}$-3-one pregnadiene.

15. The process of claim 14 wherein the 20-chloro-16β-hydroxy-$\Delta^{1,4}$-3-one pregnene is thereafter reacted with acetic anhydride to form the 20-chloro-16β-acetoxy-$\Delta^{1,4}$-3-one pregnene.

16. The 20-chloro-3-one-$\Delta^4$-16β- OR pregnene of the formula

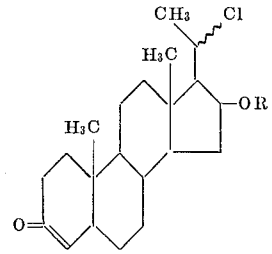

wherein R is selected from the group consisting of hydrogen and acyl.

17. The 20-chloro-3-one-$\Delta^{1,4}$-16β OR pregnene of the formula

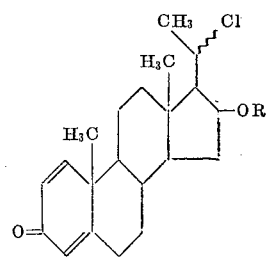

wherein R is selected from the group consisting of hydrogen and acyl.

References Cited

Kagan et al.: Journal Org. Chem. (1963), pp. 3477–3483.

ELBERT L. ROBERTS, Primary Examiner

U.S. Cl. X.R.

260—397.5, 239.5